United States Patent
Moore et al.

(10) Patent No.: US 7,165,268 B1
(45) Date of Patent: Jan. 16, 2007

(54) DIGITAL SIGNATURES FOR TANGIBLE MEDIUM DELIVERY

(76) Inventors: Keith E. Moore, 3090 Mauricia Ave., Santa Clara, CA (US) 95051; D. Amnon Silverstein, P.O. Box 10490, Palo Alto, CA (US) 94303-0969

( * ) Notice: Subject to any disclaimer, the term of this patent is extended or adjusted under 35 U.S.C. 154(b) by 1183 days.

(21) Appl. No.: 09/691,783

(22) Filed: Oct. 17, 2000

(51) Int. Cl.
H04L 9/32 (2006.01)

(52) U.S. Cl. ............................................. 726/2; 726/30

(58) Field of Classification Search ................ 713/161, 713/165, 168, 171, 200, 201; 711/164–165; 380/228–229, 232, 277–278, 282–283, 285–286, 380/29–30, 237, 239, 201, 241; 707/200, 707/203, 206, 201, 223–225, 229; 725/3; 705/3; 726/1–7, 17, 21, 26–27, 35; 369/24.01–30.01, 369/30.03–30.05; 386/15, 79–84, 105–106, 386/125
See application file for complete search history.

(56) References Cited

U.S. PATENT DOCUMENTS

| | | | | |
|---|---|---|---|---|
| 4,864,494 A | * | 9/1989 | Kobus, Jr. ................... | 726/33 |
| 5,488,410 A | * | 1/1996 | Lieberfarb et al. ........... | 726/26 |
| 5,974,150 A | * | 10/1999 | Kaish et al. ................ | 713/179 |
| 6,011,848 A | * | 1/2000 | Kanda et al. ............... | 713/170 |
| 6,021,399 A | * | 2/2000 | Demers et al. .............. | 705/39 |
| 6,038,316 A | * | 3/2000 | Dwork et al. ................ | 705/51 |
| 6,052,781 A | * | 4/2000 | Weber ........................ | 726/22 |
| 6,084,969 A | * | 7/2000 | Wright et al. ............... | 380/271 |
| 6,102,287 A | * | 8/2000 | Matyas, Jr. ................. | 235/380 |
| 6,111,956 A | * | 8/2000 | Field et al. ................. | 380/283 |
| RE36,918 E | * | 10/2000 | Micali ........................ | 380/30 |
| 6,148,404 A | * | 11/2000 | Yatsukawa .................. | 713/200 |
| 6,249,868 B1 | * | 6/2001 | Sherman et al. ............ | 713/168 |
| 6,263,439 B1 | * | 7/2001 | Hondros et al. ............ | 713/182 |
| 6,285,774 B1 | * | 9/2001 | Schumann et al. ......... | 382/100 |
| 6,357,005 B1 | * | 3/2002 | Devaux et al. ............. | 713/172 |
| 6,363,148 B1 | * | 3/2002 | Sako .......................... | 380/28 |
| 6,385,596 B1 | * | 5/2002 | Wiser et al. ................. | 705/51 |
| 6,418,421 B1 | * | 7/2002 | Hurtado et al. ............. | 705/54 |
| 6,438,235 B1 | * | 8/2002 | Sims, III .................... | 380/285 |

(Continued)

Primary Examiner—Gilberto Barron
Assistant Examiner—Leynna Ha

(57) ABSTRACT

The invention provides a method for a sender to send a message on a tangible medium and ensure that it is privacy protected until verification that the medium has been received by the authorized recipient. The invention provides a method in which a sender creates an encrypted content message that may be decrypted using a content decryption key that is unknown to the authorized recipient. The sender creates an encrypted authentication message that may be decrypted using a recipient's key that is known to the authorized recipient but is unknown to others, except perhaps to the sender. The sender fixes the encrypted content message and the encrypted authentication message onto a tangible medium and then permits the authorized recipient to obtain the tangible medium. The authorized recipient uses the recipient's key to decrypt the encrypted authentication message and then creates a valid reply that is based upon or which uses the decrypted authentication message. The authorized recipient sends the valid reply to the sender and upon verification that the reply is valid the sender allows the authorized recipient to obtain the content decryption key. With the content decryption key, the authorized recipient is able to decrypt the encrypted content message. The invention also includes an article of manufacture for sending an encrypted message from a sender to an authorized recipient using a method, of the invention.

31 Claims, 13 Drawing Sheets

U.S. PATENT DOCUMENTS

| | | | |
|---|---|---|---|
| 6,477,134 B1 * | 11/2002 | Stebbings et al. | 720/718 |
| 6,684,199 B1 * | 1/2004 | Stebbings | 705/57 |
| 6,694,431 B1 * | 2/2004 | Binding et al. | 713/160 |
| 6,763,370 B1 * | 7/2004 | Schmeidler et al. | 709/203 |
| 6,771,888 B1 * | 8/2004 | Cookson et al. | 386/95 |
| 6,832,318 B1 * | 12/2004 | Yaegashi et al. | 713/193 |
| 6,845,453 B1 * | 1/2005 | Scheidt et al. | 713/202 |
| 6,868,403 B1 * | 3/2005 | Wiser et al. | 705/51 |
| 6,935,952 B1 * | 8/2005 | Walker et al. | 463/25 |
| 6,937,729 B1 * | 8/2005 | Akins et al. | 380/239 |
| 6,961,850 B1 * | 11/2005 | Stebbings | 713/168 |
| 6,971,008 B1 * | 11/2005 | Wasilewski et al. | 713/168 |
| 7,046,607 B1 * | 5/2006 | Yamada | 369/53.21 |

* cited by examiner

320

Recipient's Instruction:

This medium includes an encrypted content message from the XYZ Company. To obtain the key to this message, send an email including the number 35758465939593 to cryptadmin@xyz.com. XYZ will reply to you with the decryption key.

322

DIGITAL SIGNATURES FOR TANGIBLE MEDIUM DELIVERY

FIELD OF THE INVENTION

The present invention relates generally to delivery of a document or other tangible medium having information fixed on the medium and verification that the medium was delivered to a specific authorized person.

BACKGROUND ART

It is well known in the art that the United States and other post offices in the world use a technique of attaching a "return receipt requested form" to letters for which verification of delivery is desired. A handwritten signature is used to guarantee that the document has been delivered to the specified party. A problem with this approach is in verifying that the person signing for the document is authorized to receive the document. Usually the post office must rely on the assumption that anyone at the address specified on the document is authorized to receive the document. The person who originally sent the document may have no mechanism to verify that the document actually was given to the authorized recipient.

Commercial package delivery services have slight extensions to the above "return receipt" mechanism, the extensions including automated scanning of the recipient's signature to make the signature viewable by way of the internet. This improves the turn around time for receiving the "receipt" but still does not assure that the document was received by the authorized party.

Therefore, there is a need for ways which assure that the contents of a document are only received by the person who is authorized to receive the document.

SUMMARY OF THE INVENTION

In the present invention, the sender of a message uses a cryptographic algorithm to protect the privacy of information recorded (fixed) on a tangible medium.

The sender creates a substantive message to be delivered to a specified authorized recipient and the inventors shall refer to this message as a "content message." The sender encrypts the content message such that it can be decrypted with a content decryption key. The sender fixes the encrypted content message onto a tangible medium such as paper or a magnetic medium, and so forth. The content decryption key is unknown to the authorized recipient.

The sender creates an authentication message and encrypts the authentication message such that it can be decrypted with a recipient's key, that is, a key held by the authorized recipient. The sender also fixes the encrypted authentication message to the tangible medium.

The sender has the tangible medium delivered such that it is received by the authorized recipient. The authorized recipient uses the recipient's key to decrypt the authentication message. The authorized recipient then uses the decrypted authentication message to create a valid reply, such as a specified number or code word, that the authorized recipient sends to the sender. The sender verifies that the reply is in fact valid and if the reply is valid, then the sender allows the authorized recipient to obtain the content decryption key. Then the authorized recipient is in possession of both the fixed medium and the content decryption key that the authorized recipient can use to decrypt the content message.

Accordingly, the invention provides a way for the sender to assure that the recipient of a tangible medium is in fact the authorized recipient and the invention provides a way for the sender to prevent an unauthorized recipient from learning the contents of the content message since such unauthorized recipient will not receive access to the content decryption key.

DETAILED DESCRIPTION

Figure 1A:
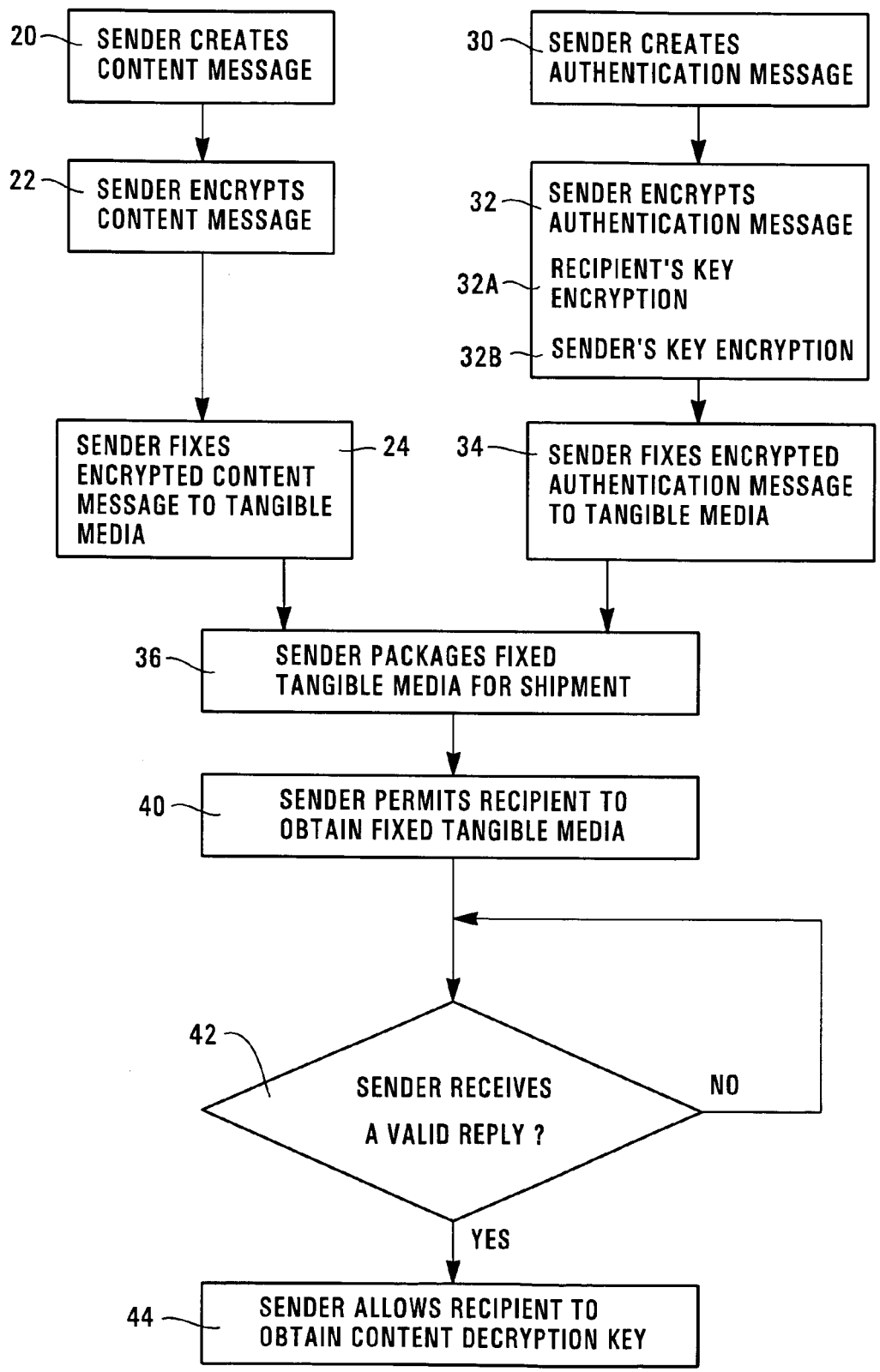
FIGS. 1A and 1B are flow charts of a method of the present invention that is used by the sender of a message that is privacy protected according to the present invention.

In the following detailed description and in the several figures of the drawings, like elements are identified with like reference numerals.

FIG. 1A is a flow chart of a method of an embodiment of the present invention. In FIG. 1A, the method illustrated is one that is used by the sender of a message that is privacy protected according to the present invention.

In step 20, the sender creates a content message. The content message is a message that the sender wishes to convey to the authorized recipient. The message contains substantive content and it is this content that motivates the communication that will occur between the sender and the authorized recipient for which the present invention is used. The content message may consist of a text message, or may consist of other types of messages such as graphical, photographic, audible or any other sort of message as may be sent in the prior art. Different embodiments of the present invention have different limitations such that it is impractical for certain types of messages that contain large amounts of data to be sent using certain embodiments of the present invention such as a paper document embodiment but such that it is practical for such messages to be sent using other embodiments of the invention such as magnetic or optical media embodiments.

In step 22, the sender encrypts the content message of step 20. In step 22, sender uses an encryption algorithm to encrypt the content message thereby creating an encrypted content message. The encryption and decryption algorithms mentioned in this disclosure are algorithms such as those known to the prior art but newly created algorithms or encryption methods are also within the spirit and scope and of the invention. In this step 22, sender encrypts the content message such that the encrypted content message may be decrypted using a content decryption key. The content decryption key is a key that is controlled by sender but is unavailable to the authorized recipient until such time as the sender decides, based on assurance of receipt due to receipt of a valid reply message, to make the content decryption key available to the authorized recipient.

In step 24, the sender fixes the encrypted content message to a tangible medium. The method of fixing is selected to be a method that is adapted to the medium that is selected. Thus, inherent in this method is that the sender selects a suitable tangible medium for conveying the encrypted content message. For example hand writing or machine printing could be used to print symbols on paper and the symbols could be human readable text or could be machine readable, such as bar codes. Magnetic media, optical media, and read only memory are a few examples of media that could be used by the present invention. By "tangible medium" the inventors refer to any tangible medium that is previously known or hereafter created since all such tangible media are within the spirit and scope of the invention. Different media may be selected on a case-by-case basis depending upon the inherent costs and conveniences of the media.

In step 30, the sender creates authentication message. The authentication message is a message that the authorized recipient will need to use in order to create a valid reply that the authorized recipient will send to the sender. The valid reply is somewhat analogous to the sender receiving a signature receipt card and the sender verifying that the signature on the card is in fact a valid signature of the authorized recipient.

For example, the authentication message may include a code number of some arbitrary length, for example, a length depending upon the level of encryption security that will be desired, such as "198576784587." The authentication message may include information such as the return address of sender, or an e-mail or internet address of sender. The sender has complete flexibility to tailor the specific contents of an authentication message. It should be understood that an authentication message should be selected by the sender such that it will not be practical for others to guess or compute the contents of the authentication message.

The sender must communicate to the authorized recipient how to use the authentication message in order to create a valid reply. The description of how to use the authentication message may accompany the authentication message or may be provided separately from the authentication message. The description of how to use the authentication message may be encrypted with the authentication message or need not be encrypted. One method of using the authentication message that the sender could specify would be for the authorized recipient to simply repeat all or part of the authentication message back to the sender. Another method that the sender could specify would be for the recipient to manipulate a part of the authentication message, such as by adding a specified number to a number that appears in the authentication message or be encrypting a number or other content that appears in the authentication message. It follows, therefore, that a valid reply may be presented by the authorized recipient to the sender either in a plaintext form or in an encrypted form, whichever is acceptable to the sender.

In step 32, the sender encrypts the authentication message step of step 30. In step 32, the sender uses an encryption algorithm to encrypt the authentication message into an encrypted authentication message. Step 32 includes step 32A in which sender encrypts authentication message such that the encrypted authentication message may be decrypted using a recipient's key. The recipient's key is a key that is unknown to others except it is known to recipient. Thus only the recipient is able to decrypt the encrypted authentication message. By "unknown" the inventors mean that for persons who do not know the key it is impractical for such persons to guess or compute the key.

One method of performing step 32A is for the sender to encrypt the authentication message using a public key of recipient where the public key has a corresponding or associated recipient's private key, that is using the public key-private key method that is known to the prior art. Using a public key method, anyone possessing a public key may encrypt a message but only the possessor of the corresponding or associated recipient's private key, which is the recipient's key in this case, can decrypt such messages.

Another method of performing step 32A is for the sender to use a shared secret key, that is, a key that is unknown to others except that it is shared between both the sender and the recipient. In this case, the shared key is a recipient's key which is provided by the recipient to the sender or in an alternative embodiment provided by the sender to the recipient, and it is understood that such provision must be made on a prearranged basis, i.e., prearranged before the sender undertakes step 32 or prearranged before some other appropriate time, i.e., pre arranged before the authorized recipient will need the recipient's key. The purpose of step 32A is to create an authentication of receipt method. Since the recipient's key is unknown to others except for recipient (or possibly except for the recipient and sender), only the recipient can decrypt the authorization message so the authorization message is kept private from all others other than the authorized recipient. This limitation of decryption only by the authorized recipient provides a method by which receipt by the authorized recipient may be validated, confirmed, or assured since, as mentioned above, the authorized recipient will need to use the authentication message in order to create a valid reply to be sent by the authorized recipient to the sender.

Step 32 may optionally include step 32B in which the sender encrypts the authentication message using a sender's key. Use of the sender's key is a method by which sender authentication encryption is performed. That is, the authentication message not only becomes encrypted to keep it private from others except for the authorized recipient but also the authentication message becomes sender authentication encrypted as well. In other words, encryption by the sender using sender's key provides a method such that decryption by the authorized recipient provides assurance that the encrypted authentication message was in fact actually encrypted by the sender and not by an impostor posing as the sender. Accordingly there is assurance to the authorized recipient that the sender was actually the source of the encrypted authentication message (and of the medium upon which the message is fixed).

The sender's key may be a sender's private key having a corresponding or associated sender's public key. Using a private key-public key method, only sender can encrypt the authentication message since only sender possesses the sender's private key, however, anyone possessing the sender's public key could decrypt the authentication message. This step 32B provides assurance to the recipient that the authentication message, and the accompanying medium, were made by sender and not by an impostor pretending to be the sender. Alternatively, step 32B may be performed by using a sender's key that is a shared secret key, that is, a key that is unknown to others but which is known to both the sender and the authorized recipient.

In the event that a private key-public key method is used for step 32B, then Step 32 would not consist of only step 32B to the exclusion of step 32A since step 32B does not provide privacy for the authentication message. In such a case, step 32B would be used in conjunction with step 32A but not instead of step 32A.

If a shared secret key approach is used, then a single step could suffice to provide both assurance that the authentication message was encrypted by the sender and to provide verification that the authentication message was decrypted by the authorized recipient. Naturally, multiple encryption can provide higher levels of security or can provide other functions lacking in single encryption embodiments.

In one embodiment of the invention, the method uses two steps of encryption where both steps use shared private keys, one supplied by sender to recipient, the other supplied by the recipient to the sender, and both supplied on a prearranged basis prior to sender undertaking the encryption described above.

In another embodiment of the invention, the method uses two steps of encryption where both steps 32A and 32B are implemented using public-private keys: in one encryption step, the sender uses his private key for encrypting or further encrypting the authorization message; in the other step, the sender uses the authorized recipient's public key for encrypting or further encrypting the authorization message. Whether a step is encrypting or is further encrypting depends upon the order of the step in relation to the other encrypting step, with the further encrypting step being performed subsequent to the other step.

Step 32A may be performed before step 32B or alternatively, step 32B may be performed before step 32A. Thus where both steps are used there is a double encryption, thus the reference in the foregoing paragraph to "encoding" or "further encoding." The authorized recipient would need to first decrypt using sender's key and then further decrypt using the recipient's key. After performing the decryption, first with one key and second with the other key, the plaintext authentication message is obtained by the authorized recipient. The encrypted authentication message, if double encrypted, could be accompanied by plaintext instructions on which key should be used first and second, and so forth.

It should be understood that step 32 may include a method in which decryption using recipient's key yields a message having a plaintext part and a remaining encrypted part. Thus the emerging plaintext part would be once encrypted and could contain information such as the identity and address of the sender or other information. Thus this method could keep the identify of the sender secret from all except the authorized recipient until the identity of the sender is revealed by decryption by the authorized recipient using the recipient's key. Decryption by the authorized recipient using the recipient's key would thus provide information to inform the authorized recipient whose sender's key should be used for the further decryption (and authentication of source) of the authentication message.

The methods described above rely on trusted methods of assuring that the sender's key and the recipient's key are valid and that this validity exists whether the keys are shared secret keys or part of a public key-private key pair; such trusted methods are known to the art.

It should be understood that the sender could use the sender's key to encrypt the content message, either before or after encryption by sender using the content encryption key. In such an event, the method of fully decrypting the content message, would include a step of decryption using the sender's key which would provide an authentication that the sender was the actual source of the content message. Such encryption of the content message using sender's key could be done in addition to, or in place of encryption of the authentication message using the sender's key.

In step 34, sender fixes encrypted authentication message to a tangible medium. The method of fixing is selected to be a method adapted to the medium that is selected. Thus inherent in the method is that the sender selects a suitable tangible medium for conveying an encrypted authentication message. Different media may be selected similar with selection for the medium upon which to fix the encrypted content message.

As mentioned above, in step 24, sender fixes the encrypted content message to a tangible medium. The medium for the step 34—fixing the encrypted authentication message—and the medium for the step 24—fixing the encrypted content message—may be the same physical object in both cases or the medium may be a different physical object. Thus the step 24 medium and the step 34 medium may be the same item such as the same piece of paper, same disk, tape, and so forth. Alternatively, step 24 may employ one item of medium and step 34 may employ an item of media that is separate from the item of media that is employed for step 24. For example, the encrypted authentication message of step 34 may be fixed on the outside of an paper envelope while the encrypted content message of step 24 may be fixed on a paper, disk, or tape that is contained within the envelope.

It should be understood that FIG. 1A is representative in that the fixing method of step 34 may be performed before that of step 24, or simultaneous with that of step 24. Similarly, the methods of steps 20–22–24 may be carried out prior to, subsequent to, or simultaneous with the methods of steps 30–32–34.

In step 36, the sender confirms that both the encrypted authentication message and the encrypted content message have been fixed to the tangible media and the sender places the tangible media in an appropriate shipping or mailing envelope to protect the tangible media from damage that might occur during delivery to the authorized recipient. The envelope also provides a privacy function and can serve as another embodiment of the invention, as discussed elsewhere in this specification in further detail.

In step 40, the sender permits the recipient to obtain the fixed tangible medium. When the inventors say "the fixed tangible medium" we are now referring to the one or more tangible media upon which information was fixed during steps 24 and 34. The method of step 40 may be carried out by the sender mailing the fixed tangible medium to the authorized recipient, by sending the fixed tangible medium by a courier service such as one of the well known package and letter delivery services, by using a delivery person employed by the sender, or by allowing the authorized recipient or the authorized recipient's agent to visit the sender's premises to retrieve the fixed tangible medium. It should be understood that the foregoing methods of permitting the authorized recipient to obtain the fixed tangible medium are representative methods only.

In step 42, the sender makes a determination as to whether the sender has received a valid reply. In the method of step 42, the sender determines whether the sender has received a reply which is a valid reply. A valid reply is one that is based upon the decrypted authentication message according to the requirements of the sender. By "based upon" the inventors mean that the valid reply in some fashion uses the decrypted authentication message or uses information obtained from the decrypted authentication message. An example of a valid reply could be a reply complying with a requirement that the authorized recipient simply repeat back verbatim the decrypted authentication message.

Since only the authorized recipient possesses the decryption key necessary to fully decrypt the encrypted authorization message, receipt of a valid reply by the sender provides assurance that the authorized recipient has actually received the fixed tangible medium.

In implementing step 42, the sender must make provision for receipt of a valid reply. A non-exhaustive list of ways that the sender could make provision for receipt of a valid reply are the following: a manually implemented method such as designating a particular employee of the sender to receive the valid reply as by telephone, electronic mail, United States Postal Service mail, and so forth; a machine implemented method such as automatically scanning the contents of incoming electronic mail, providing a touch-tone or voice operated phone system such that an authorized recipient may telephonically communicate a valid reply; or processing items of tangible media (such as letters) that may contain a valid reply. It can be understood that the machine implemented methods described above have advantages in speed that manual methods may lack.

In step 42, if the sender has not determined that sender has received a valid reply, then sender simply takes no action, that is, the sender does not allow the recipient to obtain the content decryption key. If, on the other hand, the sender does receive a valid reply, then the sender proceeds to step 44 wherein the sender allows the authorized recipient to obtain the content decryption key. The sender may employ any of the methods described in the foregoing paragraph in order to permit the authorized recipient to obtain the content decryption key. For example, in a manually implemented method of receiving a valid reply, the sender may use the same manual method as part of the same transaction to allow the authorized recipient to obtain the content decryption key or the sender may use a different manual method or may use an automated method. Where a machine implemented method is used by sender to receive a valid reply, the sender may use the same machine method to allow the authorized recipient to obtain the content decryption key. Thus, for example, if the sender scans incoming electronic mail to determine if a valid reply has been received by the sender, then the sender may use an automatic electronic mail reply to send the content decryption key to the authorized recipient thereby allowing the authorized recipient to obtain the content decryption key. It should be understood that one embodiment of the method of this invention does not necessarily require the authorized recipient to use the content decryption key, the method of this invention merely contemplates that the authorized recipient will be allowed to obtain the content decryption key. If the authorized recipient fails to use the content decryption key, the authorized recipient simply fails to read (decrypt) the encrypted content message.

In step 44, where the sender allows the authorized recipient to obtain the content decryption key, the sender may encrypt the content decryption key, as for example, using the authorized recipient's public key such that the content decryption key may be decrypted by the authorized recipient using the authorized recipient's corresponding private key but with such encryption preventing unauthorized third parties from obtaining access to the content decryption key.

Figure 1B:
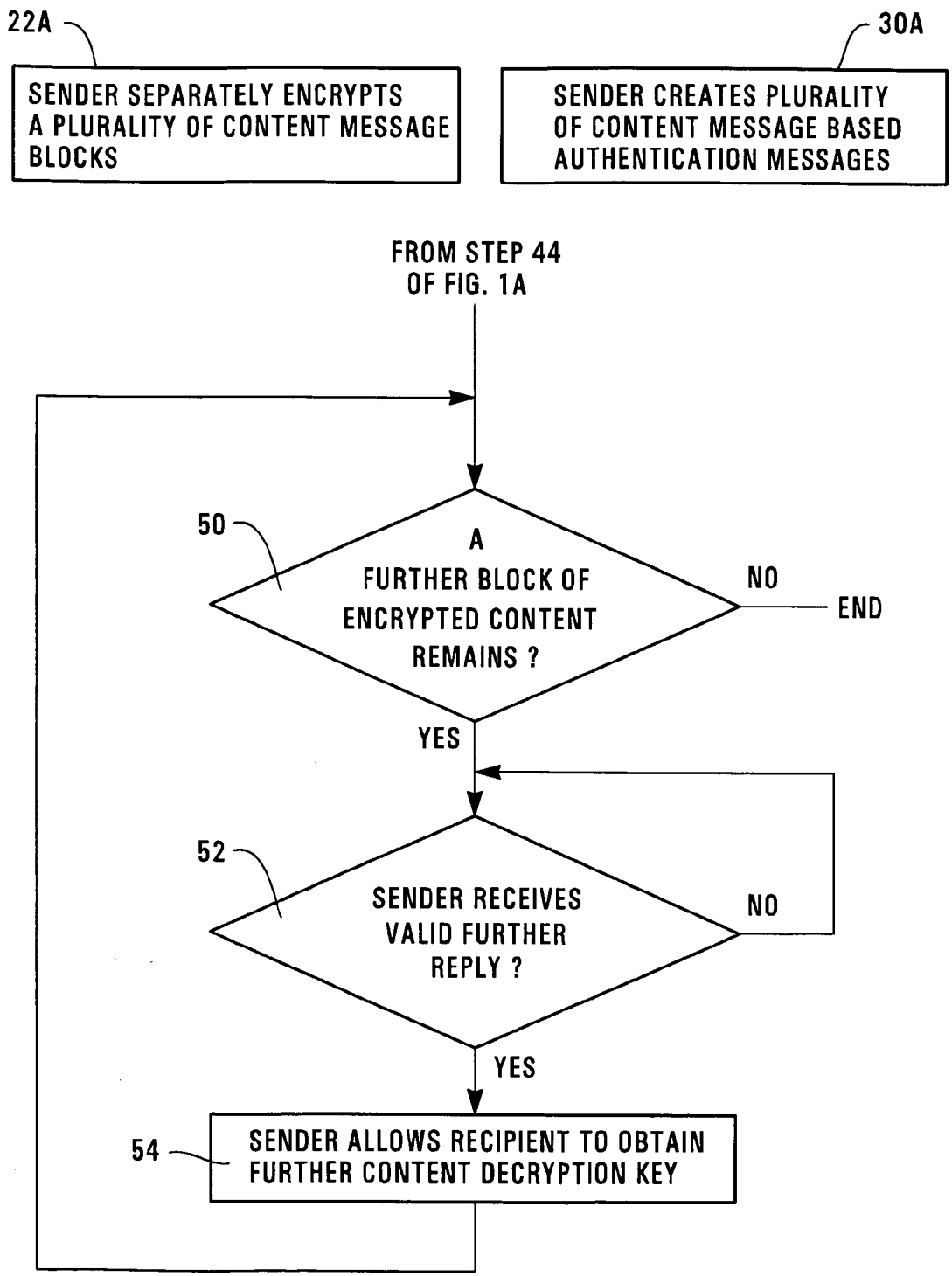

FIG. 1B illustrates features that may optionally be provided with the embodiment of the present invention illustrated by FIG. 1A. In step 22A of FIG. 1B, the sender encrypts the content message as in step 20 of FIG. 1A. However, the sender performs encryption of step 22A by separately encrypting a plurality of content message blocks using separate content decryption keys for each respective content message block.

These separate content message blocks may be of any length of data chosen by the sender and the blocks may be interrelated in content or may be non-interrelated in content. For example, the length of a content message block may be line-at-a-time, in which each content message block is a line of data. Conversely, a message block may be an entire software program, an entire song, an entire video work, with a plurality of such items on tangible media. By "interrelated" the inventors mean that in order to gain full use of one block, another block is needed by the authorized recipient. By non-interrelated, the inventors mean the converse, that is, the benefits of separate blocks may be obtained by the authorized recipient without necessarily using or having decrypted other blocks.

In step 30A of FIG. 1B, the sender creates separate authentication messages, each authentication message corresponding to a respective content message block. Step 30A of FIG. 1B is performed in addition to step 30 of FIG. 1A. The difference between step 30A and step 30 is that step 30A is used as a companion to step 22A of FIG. 1B to provide a plurality of authentication messages, with each authentication message having a respective content message block.

In this embodiment, a particular authentication message is used by the authorized recipient in order to obtain the next content message block that is desired by the authorized recipient. In other words, the authorized recipient will use a particular decrypted authentication message and create a valid further reply where the valid further reply is based upon the particular decrypted authentication message. So, for example, in FIG. 1B let us suppose that the sender has carried out steps 22A and 30A. The result will be a number of content message blocks which we designate as $B_1$, $B_2$, $B_3$, . . . $B_n$ and these message blocks have respective authentication messages $A_1$, $A_2$, $A_3$, . . . $A_n$ and the message blocks further have respective content decryption keys $K_1$, $K_2$, $K_3$, . . . $K_n$. In this embodiment the subscript n in the foregoing sentence is an integer that is equal to two or greater than two.

In order for the authorized recipient to obtain the first content message block, $B_1$, the process of FIG. 1A will proceed and the sender will receive the first valid reply at step 42. The first valid reply is based on an authentication message ($A_1$) as discussed in connection with the discussion of FIG. 1A, above. In step 44 of FIG. 1A, the sender allows the authorized recipient to obtain the first content message block decryption key, $K_1$, and the authorized recipient proceeds to decrypt the first message block $B_1$.

In a preferred embodiment of the invention described by FIG. 1B, further authentication messages $A_2$, $A_3$, $A_4$ . . . $A_n$ are based upon the decrypted content of a content message block that was previously decrypted, for example, $A_2$, $A_3$, $A_4$ . . . $A_n$ may consist of preceding content message blocks $B_1$, $B_2$, $B_3$, . . . $B_{n-1}$ that have been decrypted by the authorized recipient. Accordingly, we could say that $A_2=B_1$, $A_3=B_2$, and so forth.

In one embodiment, the authorized recipient is instructed to construct a valid further reply by quoting back to the sender a specified portion of the content of the authentication message, the portion being any amount of the authentication message, up to and including the entire message. In another embodiment, the authorized recipient is instructed to construct a valid further reply by performing a specified function or algorithm on the authentication message, such as by using the MD5 algorithm that was developed by Professor Ronald L. Rivest of MIT. The following is a summary of the function of the MD5 algorithm which may be found in *Network Working Group Request for Comments* 1321 by R. Rivest, MIT Laboratory for Computer Science and RSA Data Security, Inc., April 1992.

> [The MD5 algorithm] takes as input a message of arbitrary length and produces as output a 128-bit "fingerprint" or "message digest" of the input. It is conjectured that it is computationally infeasible to produce two messages having the same message digest, or to produce any message having a given pre-specified target message digest. The MD5 algorithm is intended for digital signature applications, where a large file must be "compressed" in a secure manner before being encrypted with a private (secret) key system under a public-key cryptosystem such as RSA.

The authorized recipient would then use decrypted message block $B_1$, which serves as authentication message $A_2$, and the authorized user creates a valid further reply that is based upon $B_1$. with the valid further reply being created according to the requirements specified by the sender.

When an embodiment of the present invention specifies or requires that an authentication message will consist of a previously decrypted content message block, a benefit of the present invention is that it provides verification that the authorized recipient has decrypted the previous content message block. This verification of decryption goes a step further than simply allowing the authorized recipient to obtain the first content decryption key; it provides a positive verification that the previous content message block has been decrypted by the authorized recipient. Thus an embodiment of the present invention provides confirmation that the authorized recipient has received a specified content message, has had the ability to read (decrypt) the content message, and has actually read (decrypted) the content message.

Where there are n content message blocks that have been read by the authorized recipient using the method just described, the invention provides a way in which the sender may obtain confirmation that the authorized recipient has read n−1 blocks. However, at the point of the last block that the authorized recipient chooses to read but chooses not to ask for a further content message block decryption key, there is no further feedback mechanism and the sender will not have a positive verification that the authorized recipient has in fact read the last block. However, this limitation may be overcome by adding a supplemental block and then motivating the authorized recipient to continue to request the supplemental content message block decryption key but withholding from the authorized recipient the fact that the contents of the supplemental content message block may be a nullity, inconsequential, or of minimal value. For example, the present invention may provide a message stating "for the XYZ content decryption key, please send a valid further reply to sender specifying that you desire the XYZ content. The valid further reply is constructed based upon the content block that you just decrypted." With the valid further reply having been received by the sender, the sender may provide the further decryption key and while the XYZ content may be useful to the authorized recipient, that content may have been obtained by the sender at minimal cost. Other methods may be readily employed by the present invention in which the invention motivates the authorized recipient to continue to request further content decryption keys but where the primary object of the sender is to verify that the authorized recipient has actually read a content message block for which the authorized recipient previously was allowed to obtain a content message block decryption key.

It should be understood that where there is a plurality of message blocks and the number of blocks is equal to three or greater, then the access (decryption) by the authorized recipient to further encrypted content message blocks may be sequential, or non-sequential, according to the specifications that the sender used performing the process of FIGS. 1A and 1B, that is, according to the determination of the sender. In a sequential access method, a specified access order would need to be followed, such as only $B_2$, and no other further message block, may be accessed by the authorized recipient immediately after $B_1$, then only $B_3$ may be accessed after $B_2$, and so forth. In a non-sequential access method, any of $B_2$, $B_3$, and so forth may be accessed immediately after $B_1$, and so forth. The method of the present invention may employ instructions to the authorized recipient such that the authorized recipient not only creates a valid further reply but also, in conjunction with that reply, the authorized recipient also specifies the identity of the next content message block which the authorized recipient desires to decrypt. Accordingly, having received this message from the authorized recipient, the sender may select the next content decryption key to provide to the authorized recipient according to the particular content message block that was specified by the authorized recipient.

In step 50, the sender determines whether or not there is at least one further block of encrypted content message that has not yet been decrypted by the authorized recipient. Thus, having already provided to the authorized recipient a first content message block decryption key, $K_1$, sender now determines whether the fixed tangible medium that the recipient obtained contains at least one further block of encrypted content message. If the determination is "no", that there are no further blocks of encrypted content message, then the process ends. On the other hand, if the determination is "yes" that at least one further block of encrypted content message remains, then the sender performs step 52 which is the sender determines if the sender has received a valid further reply.

If the answer to step 52 is "no" that the sender has not received a valid further reply, then the sender takes no action. On the other hand, if the answer to step 52 is "yes" that the sender has indeed received a valid further reply, then the sender proceeds to step 54 in which the sender chooses the appropriate further content decryption key to allow the authorized recipient to obtain and in which step the sender allows the authorized recipient to obtain that further content decryption key. After performing step 54, step 50 is once again performed (determining if a further block of encrypted contents remains) and so forth.

It should be understood that the instructions which lead the authorized recipient through the steps of requesting a further content decryption key may be embodied on the tangible medium, may be provided by sender as part of a separate message sent by sender, as accompanying a content decryption key, and so forth.

The method of using a plurality of message content blocks in conjunction with using valid further replies, described above, may be employed in connection with any of the other embodiments of the present invention that are described herein.

Figure 2A:
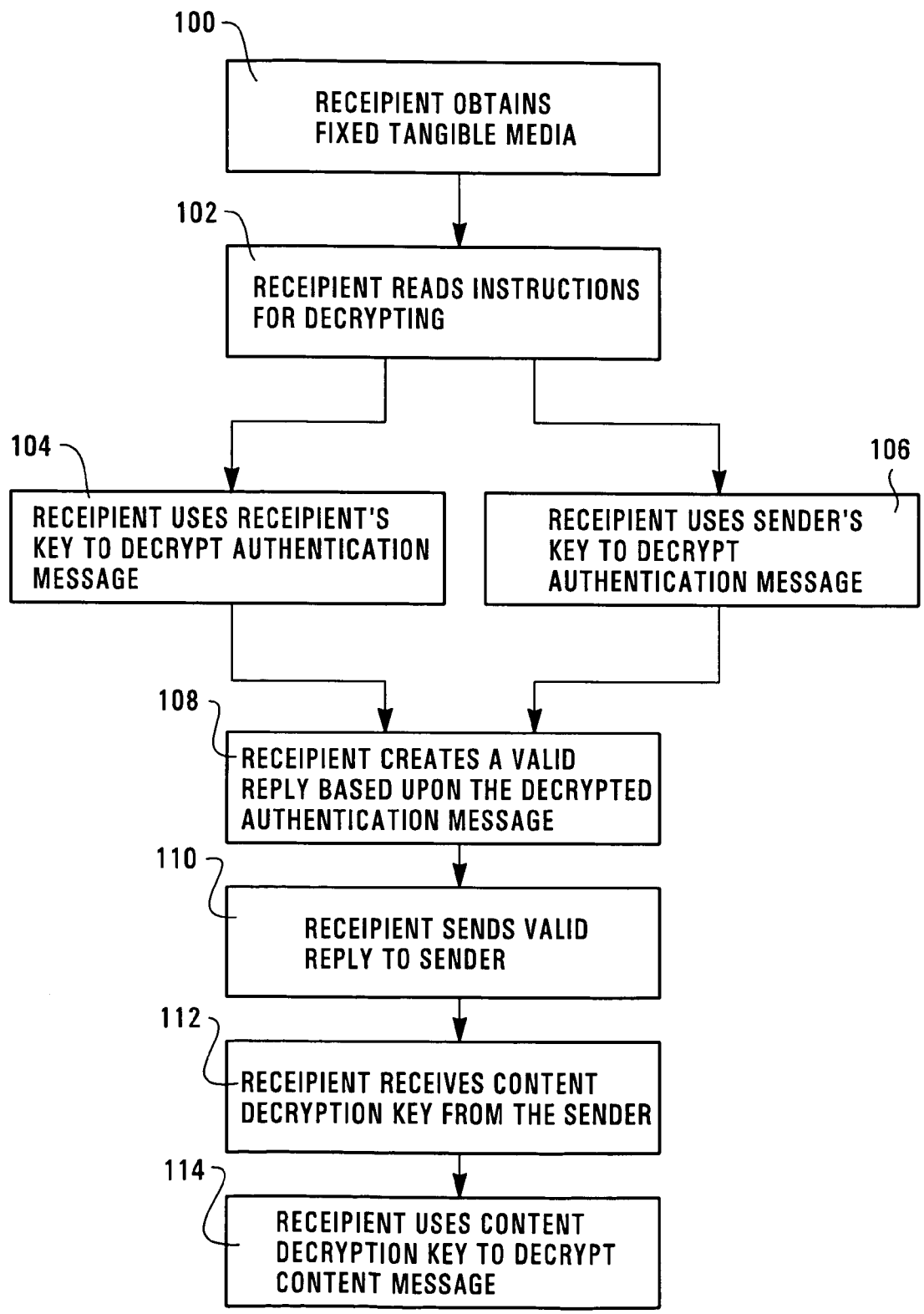
FIGS. 2A and 2B are flow charts of a method of the present invention that is used by the recipient of a message that is privacy protected according to the present invention.

FIG. 2A illustrates an embodiment of the invention which is a method that is used by the recipient of a message that is privacy protected according to the present invention.

In step 100, the recipient obtains a fixed tangible medium. The fixed tangible medium is as described in connection with FIGS. 1A and 1B. In step 102, the recipient reads instructions for decrypting the message. Step 102 is carried out according to the method that the sender used to provide instructions. Since instructions may already be known to the recipient, based on previous agreement or practice, this step may in some cases be omitted.

In step 104, the recipient uses the recipient's key to decrypt the authentication message. In step 106 the recipient uses the sender's key to decrypt the authentication message. It should be understood that steps 104 and 106 employ the decryption method that corresponds to the encryption that was carried out as described for step 32, including steps 32A and 32B. Accordingly, the order of encryption, the choice of key type for encryption, multiple or single encryption, and so forth that are employed by step 32 will determine the method that the recipient will need to use in order to carry out the method of step 104 and 106. After having carried out steps 104 and 106, the recipient will have successfully obtained the decrypted authentication message if the recipient is indeed the authorized recipient.

After having obtained the decrypted authentication message, the authorized recipient then follows instructions or established procedures and creates a valid reply based upon that decrypted authentication message. This is carried out in step 108. The valid reply may be encrypted, as by the authorized recipient using the sender's public key to encrypt the valid reply, and so forth.

In step 110, the authorized recipient sends a valid reply message to the sender. This step is carried out according to the method or methods that sender permits to be employed and examples of possible methods are discussed in connection with step 42, above.

After having sent the valid reply message to sender, the recipient in step 112 receives the content decryption key from the sender. This step is carried out according to the method or methods that the sender employs to permit the authorized recipient to receive the content decryption key and examples of such methods are discussed in connection with step 44, above. It should be understood that the method of communicating for steps 42 and 110 and for steps 44 and 112 need not be the same method of communicating. After step 112 has been carried out, the authorized recipient proceeds to step 114 and then uses the content decryption key to decrypt the content message whereupon the authorized recipient may read and understand the content message.

Figure 2B:
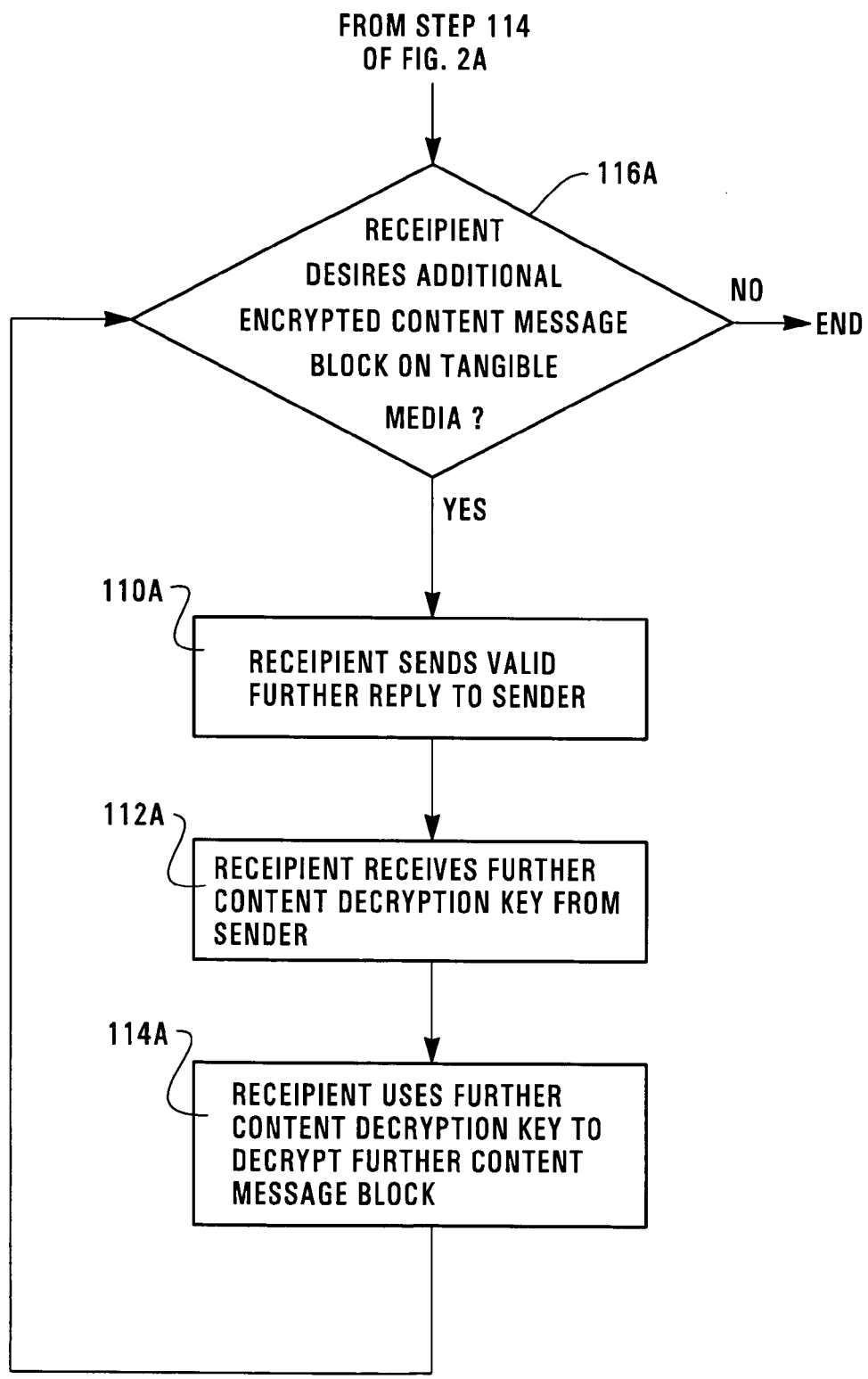

FIG. 2B illustrates a method of the present invention that is used by a recipient of a message that is privacy protected in accordance with steps 22A, 30A, 50, 52, and 54 as illustrated in FIG. 1B, that is, there are a plurality of content message blocks that the authorized recipient has received on the tangible medium which the authorized recipient desires to decrypt. Some of the steps in FIG. 2B are similar to some of the steps of FIG. 2A. In step 116A of FIG. 2B, the authorized recipient determines if there remains at least one additional content message block on the tangible media and, if so, the authorized recipient determines if it wishes to decrypt such additional content message block. If there are no further blocks or the authorized recipient does not desire to continue, then this process is finished. However, if there is a further block and the authorized recipient desires to continue, then the authorized recipient proceeds to step 110A.

Step 110A is a step in which the authorized recipient sends a further valid reply to the sender. As discussed above, this further valid reply is based upon a content message block that has been already decrypted by the authorized recipient. As discussed above, this further valid reply sent by the authorized recipient provides to the sender assurance that the authorized recipient has indeed read the content message block upon which the further valid reply is based.

In step 112A, the authorized recipient receives a further content message block decryption key from the sender. In step 114A, the authorized recipient uses the further content decryption key to decrypt a further content message block. The process then returns to step 116A where the authorized recipient again determines if there remains at least one additional content message block on the tangible media and, if so, the authorized recipient determines if it wishes to decrypt such additional content message block. If there are no further blocks or the authorized recipient does not desire to continue, then this process is finished. However, if there is a further block and the authorized recipient desires to continue, then the authorized recipient proceeds to step 110A, as before, and the process is repeated with the authorized recipient gaining access to further content message blocks and with the sender gaining confirmation that the authorized recipient has read further content message blocks.

Figure 3:
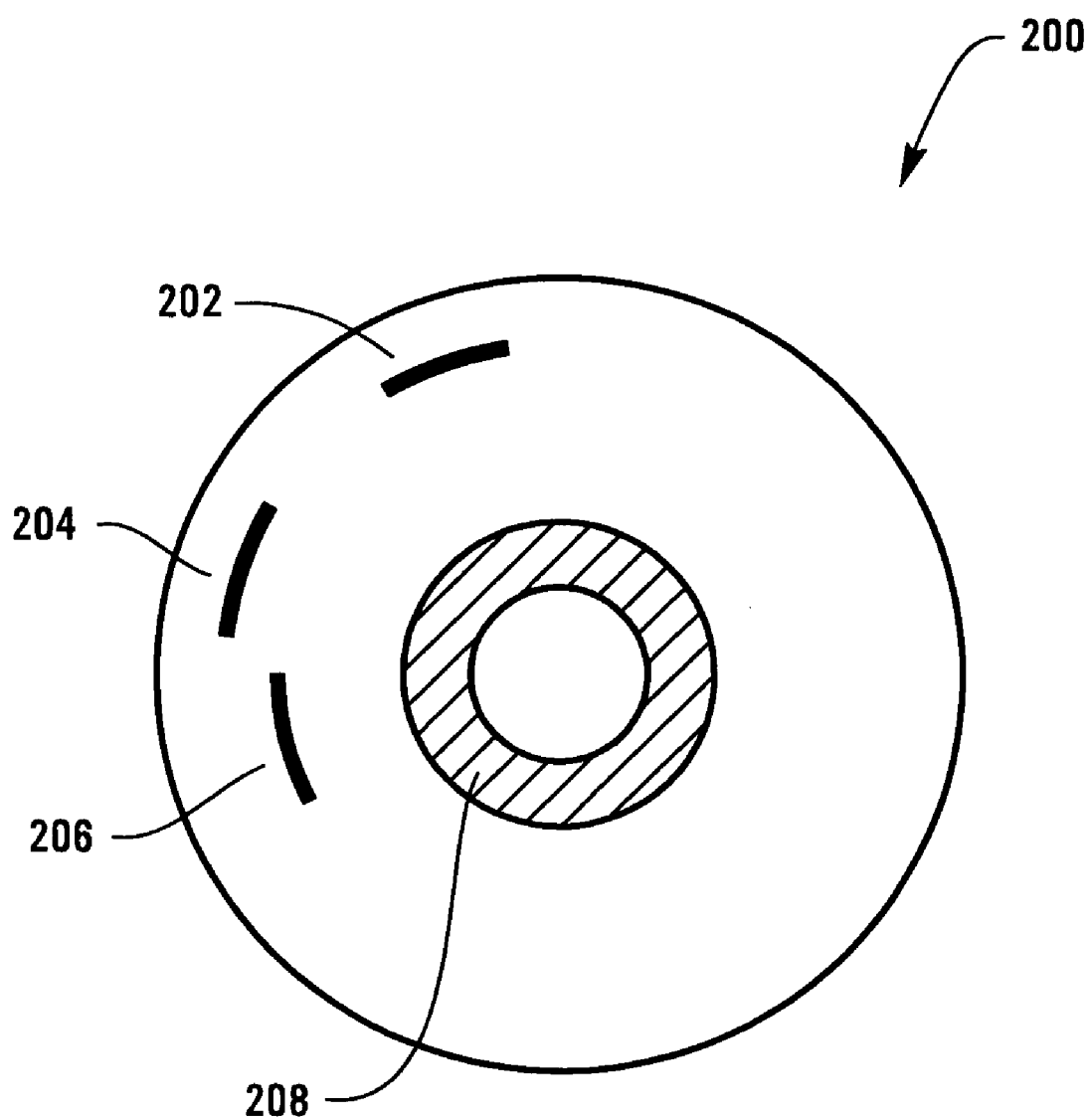
FIG. 3 is a drawing of a compact disk read only memory (CD ROM) which is an example of one representative type of fixed tangible medium which may embody an article of manufacture of the present invention.

FIG. 3 illustrates an article of manufacture of the present invention. This article of manufacture is a fixed tangible medium that is created in accordance with steps 20 to 34 of FIG. 1A, and optionally with steps 22A and 30A of FIG. 1B, all described above. The fixed tangible medium illustrated is a disk which could be a magnetic or optical disk, a read only memory, or other type of medium, and this illustration is representative in that any other type of fixed tangible media may embody the invention. The fixed tangible medium 200 has an encrypted content message 202, an encrypted authentication message 204, instructions 206, as well as label 208.

Encrypted content message 202 is a content message that has been created, encrypted, and fixed on fixed tangible medium 200 by a sender in accordance with the method set forth in steps 20 to 24, above. The content decryption key that will be used to decrypt the encrypted content message 202 is a key that will be unknown to the authorized recipient at the time that the authorized recipient receives fixed tangible medium 200.

Encrypted authentication message 204 is a message that has been created, encrypted, and fixed on tangible medium 200 by a sender in accordance with the method set forth in steps 30 to 34, above. As mentioned in connection with the method described above, the tangible medium upon which the encrypted authentication message 203 is fixed may be the same item of tangible medium as that upon which the encrypted content message is fixed or it may be a separate item of tangible medium. Encrypted authentication message 204 is encrypted by sender to have a recipient's decryption key that is unknown to others, other than the authorized recipient. In addition, encrypted authentication message 204 may be encrypted by sender such that a sender's key, such as the sender's public key associated with a sender's private key-sender's public key pair, such that decryption using the sender's key provides authentication that the sender was the source of the message. Instructions 206 for handling the fixed tangible medium, may be provided on tangible medium 200 in an electronic form or a human readable form.

Instructions 206 may be in the form of a readable document or they may be interactive, such as software to display windows or screens on a video display. Instructions 206 may include the decryption algorithms that will be necessary for the authorized recipient to decrypt the contents of tangible medium 200. The recipient of the tangible medium may then follow the instructions in the text of as displayed by such windows or screens.

Label 208 may be employed by fixed tangible medium 200 may be a paper label or may otherwise be written to provide human readable information. Label 208 may, for example, include an identification of fixed tangible medium 200 or of its sender or may provide startup instructions for accessing information on fixed tangible medium 200.

Figure 4A:
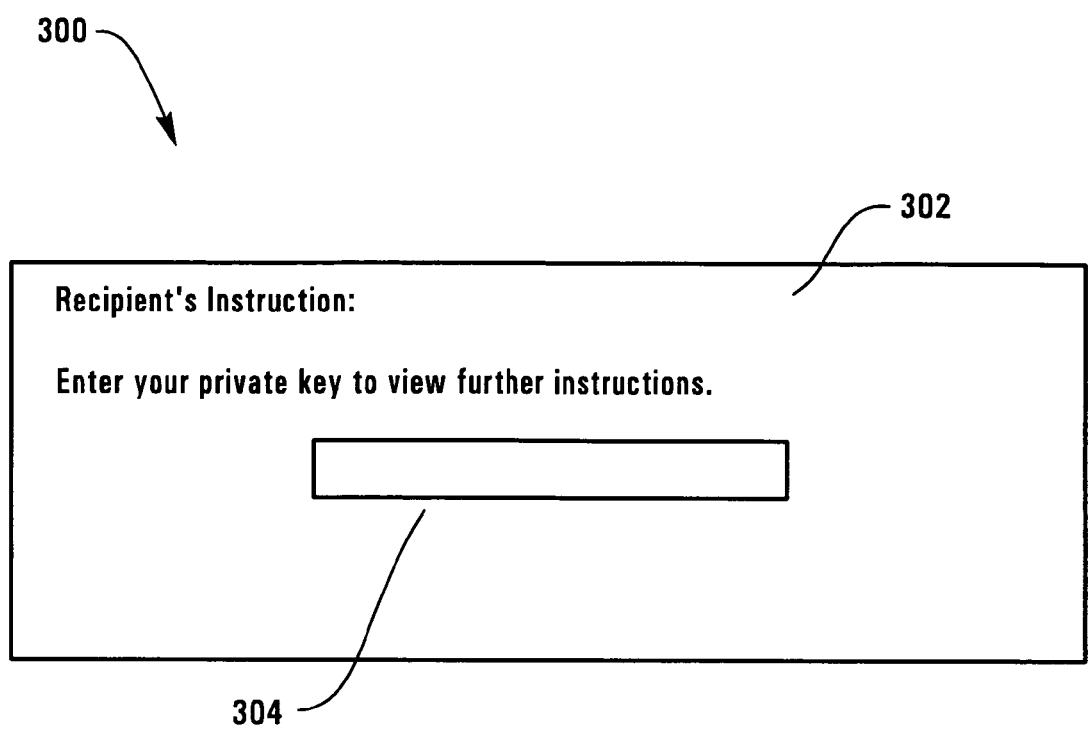
FIGS. 4A, 4B, 4C, and 4D are examples of video screen displays that may be employed with the present invention.

Now turning to FIG. 4A, there is illustrated a screen display that is representative of those that may be employed either by a method or by an article of manufacture of the present invention. (Other screen displays that are described below are also representative only.) After the authorized recipient has placed fixed tangible medium 200 into a compatible media reading device, and followed instructions 206 to start a viewing method, the recipient's key input display 300 of FIG. 4A is provided on the authorized recipient's video screen. The recipient's key input display 300 includes recipient authentication instructions 302 which may consist of text such as the following representative text: "Recipient's instructions: Enter your private key to view further instructions." Recipient's key input display 300 includes a recipient's key entry window 304. The authorized recipient who views the recipient's key input display 300 screen then follows instructions 302 and inputs the recipient's key into recipient's key entry window 304.

Figure 4B:
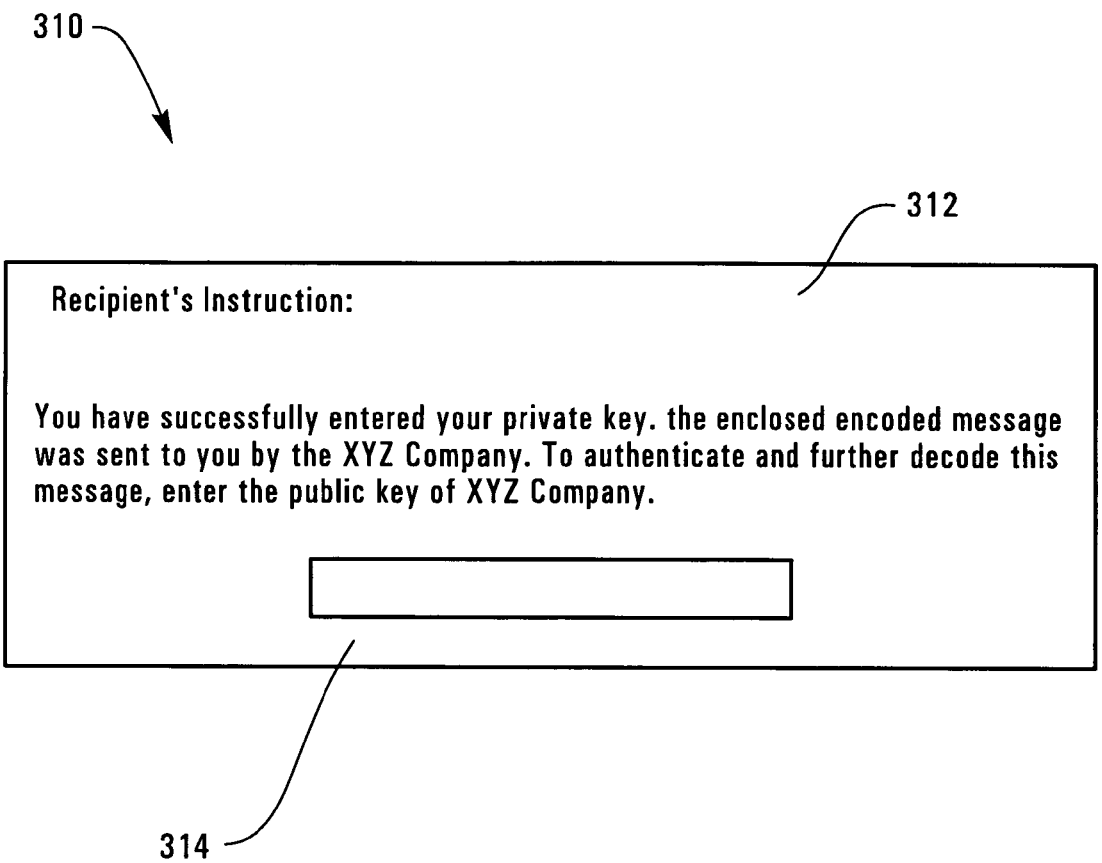

After having inputted the recipient's key into the recipient's key entry window 304, instructions 206 of fixed tangible medium 200 then cause a subsequent screen display to be displayed on the authorized recipient's video screen. This and others screen displays are similarly software implemented by software or data, or their combination, which are included within instructions 206 of fixed tangible medium 200. The subsequent screen display is sender authentication screen 310 which is illustrated by FIG. 4B. The sender authentication screen 310 includes recipient authentication instructions 312 which may consist of text such as the following text: "Recipient's Instructions: You have successfully entered your private key. The enclosed encrypted message was sent to you by the XYZ Company. To authenticate and further decrypt this message, enter the public key of XYZ Company." The authorized recipient who views the sender authentication screen 310 window then follows instructions 312 and inputs the public key of XYZ Company into sender's key entry window 314.

Figure 4C:
Figure 4C:

Now turning to FIG. 4C, there is illustrated a fully decrypted authorization message screen display 320 that appears on the video display of the authorized recipient after full decryption of the encrypted authorization message 204 that has been fixed to fixed tangible medium 200. The fully decrypted authorization message screen display 320 includes recipient authentication instructions 322 which may consist of text such as the following representative text: "Recipients Instructions: This medium includes an encrypted content message from the XYZ Company. To obtain the key to this message, send an e-mail including the number 35758465939593 to cryptadmin@xyz.com. XYZ will reply to you with the decoding key." The authorized recipient who views the fully decrypted authorization message screen display 320 then follows the instructions in order that the sender receives a valid reply and in turn allows the authorized recipient to obtain the content decryption key.

Figure 4D:
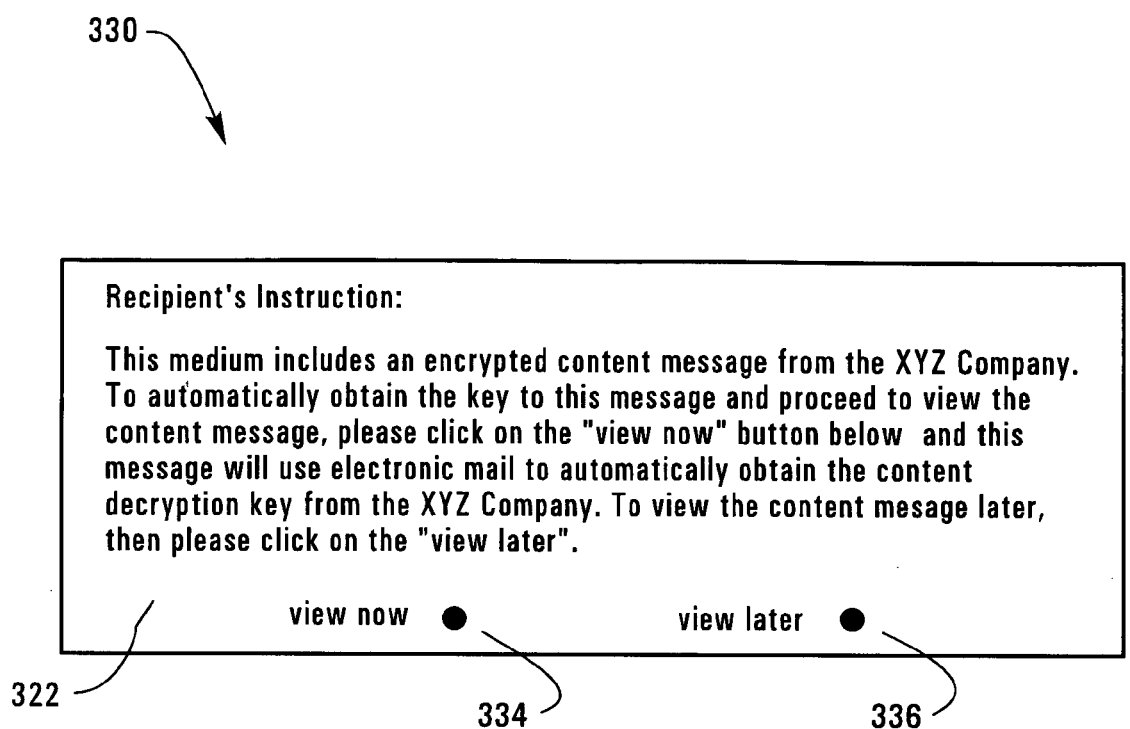

FIG. 4D shows an alternative embodiment of the screen display of FIG. 4C. FIG. 4D is also displayed after the authorization message has been fully decrypted. In FIG. 4D, there is illustrated a content decrypt screen 330. The content decrypt screen 330 includes content decrypting instructions 332 which may consist of the following representative text: "Recipient's Instructions: This medium includes an encrypted content message from the XYZ Company. To automatically obtain the key to this message and proceed to view the content message, please click on the "now" button below and this message will use electronic mail to automatically obtain the content decryption key from the XYZ Company. To view the content message later, then please click on the "view later" button."

The recipient's computer, using instructions 206 of fixed tangible medium 200 which implement content decrypt screen 330, determines if the "view now" button 334 is selected. If that button has been selected, then an e-mail or the like is automatically sent to the XYZ Company, or its designee. The e-mail includes a valid reply as well as the e-mail reply address which will allow the XYZ Company's automatic system to reply in real time with the content decryption key such that instructions 206 of fixed tangible medium 200 will cause the decrypted content message to be displayed as a next screen display.

If the "view later" button 336 is selected, then instructions 206 of fixed tangible medium 200 can cause the termination of the viewing method, either by discarding (forgetting) the authentication message decryption results or by recording them to the fixed tangible medium 200 (if that medium is not write-protected) such that the authorized recipient may view later by simply resuming the viewing method at a more convenient time by proceeding directly to screen 330 of FIG. 4D.

Figure 5:
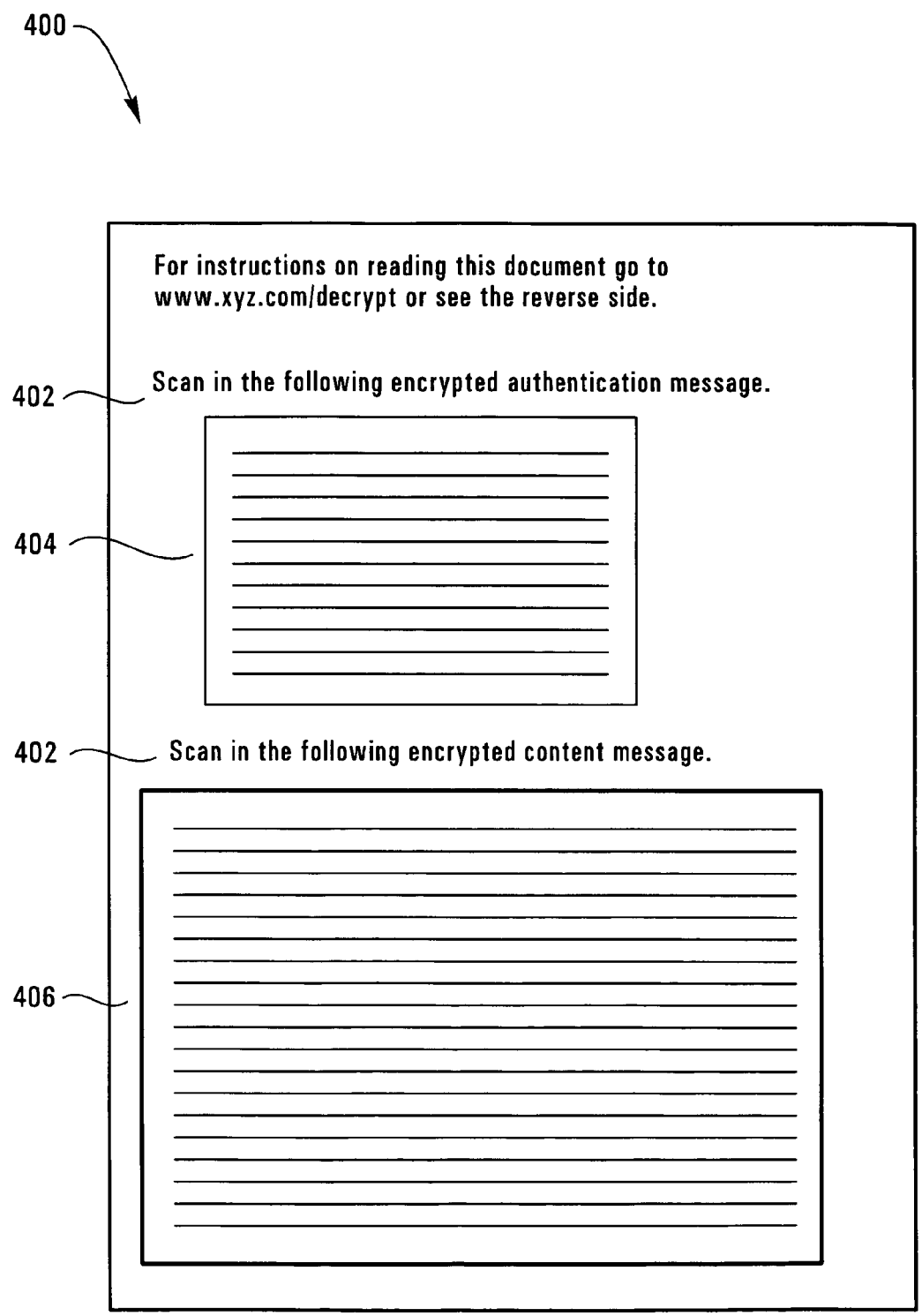
FIG. 5 is a drawing of a single page of a paper document which is yet another representative type of tangible medium that may embody the present invention.

FIG. 5 illustrates a fixed tangible medium of the present invention where the medium chosen is paper medium 400 or another optically or visually read medium. Paper medium 400 includes authentication and content decryption instructions 402 or a reference to where such instructions can be found. Paper medium 400 also includes a fixed copy of an encrypted authentication message 404. In addition, paper medium 400 may, in a single item of medium or a separate accompanying item of medium, include an encrypted content message 406.

Authentication and content decryption instructions 402 may include text such as the following: "For instructions on reading this document go to www.xyz.com/decrypt or see the reverse side." Instructions 402 may include instructions such as "Scan in the following encrypted authentication message:" may accompany encrypted authentication message 404 as can "Scan in the following encrypted content message:" which may accompany encrypted content message 406. Encrypted authentication message and encrypted content message may be fixed to paper medium 400 using characters that may be scanned using an optical character reader or text scanning equipment. Among other alternatives, would be to use bar code printing to print the encrypted messages onto paper medium 400.

Figure 6A:
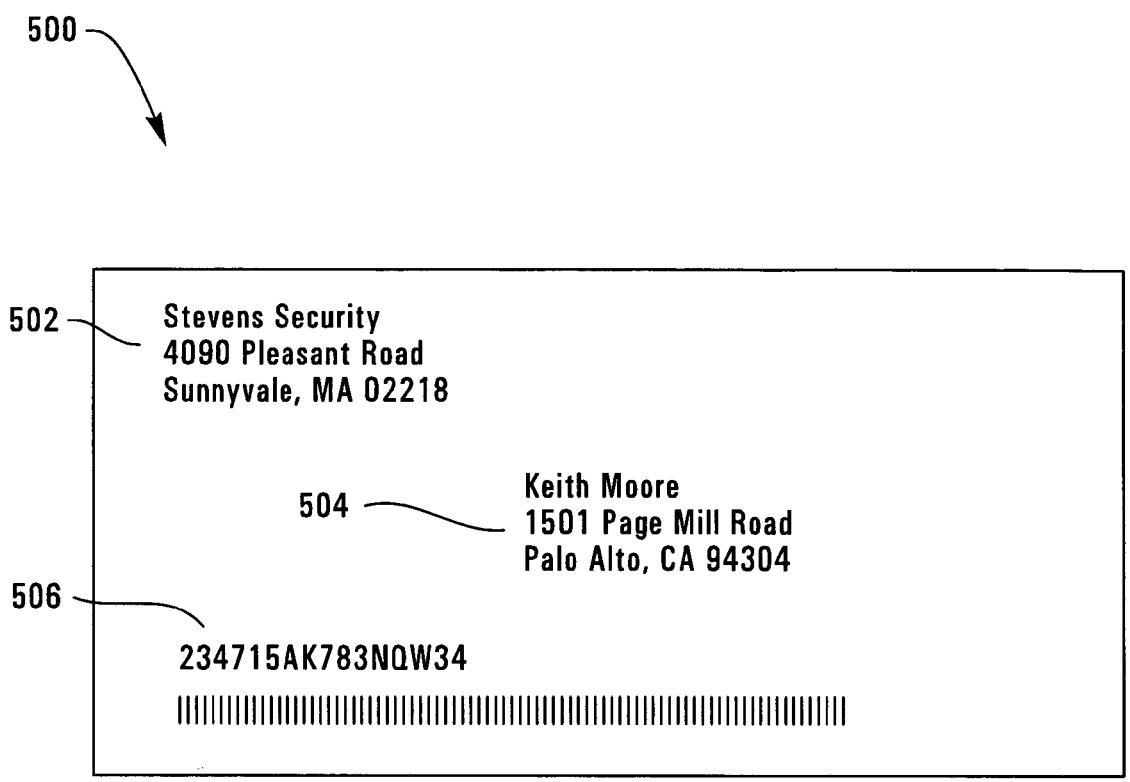
FIG. 6A is a drawing of a paper envelope which may be employed with the present invention, the envelope having an encrypted authentication message fixed on the outside of the envelope.
Figure 6B:
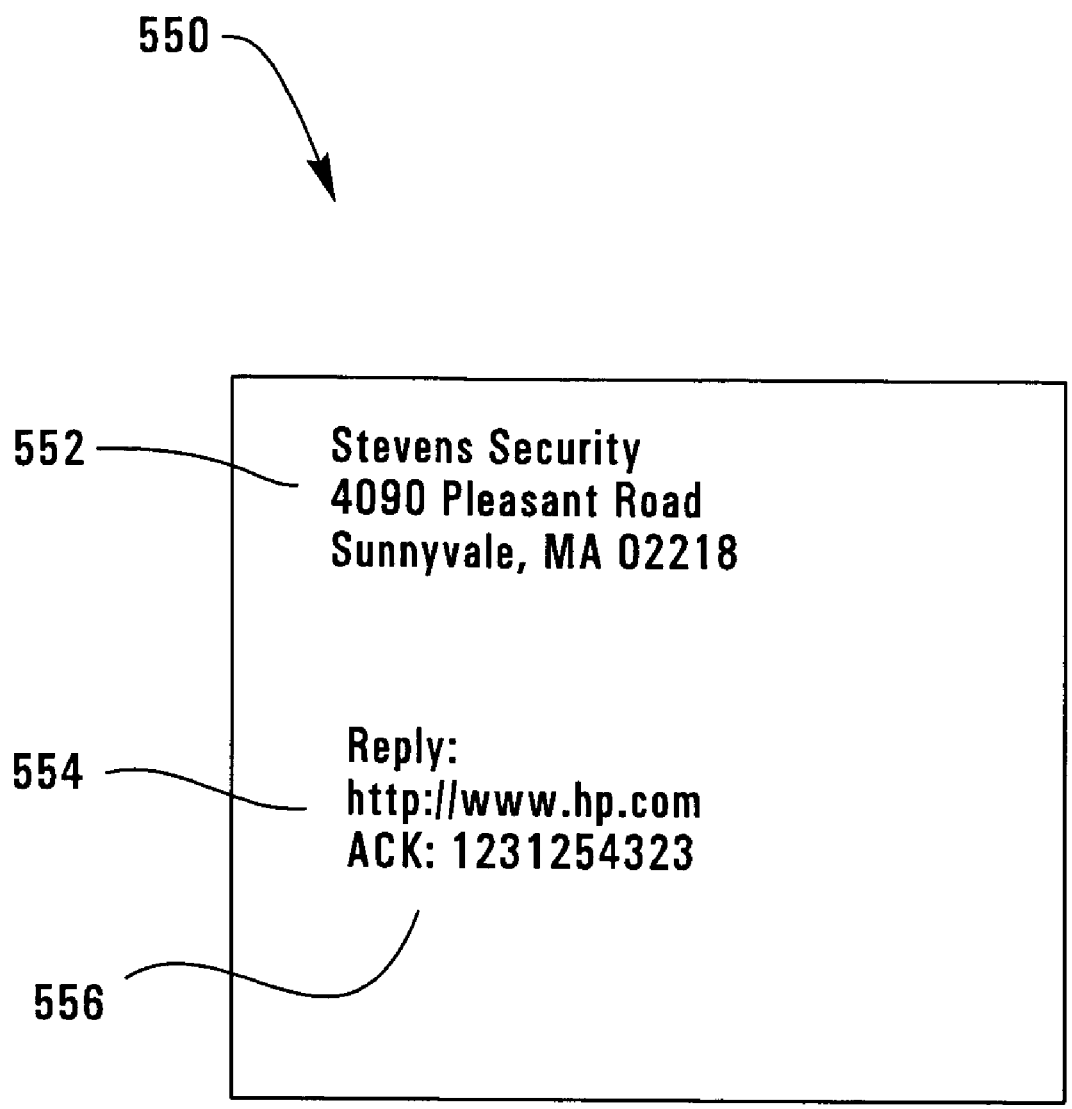
FIG. 6B is a sample message resulting from decryption of the encrypted authentication message on the envelope of FIG. 6A.

FIG. 6A illustrates another embodiment of a fixed tangible medium of the present invention. Envelope 500, illustrated by FIG. 6A, has a sender's address block 502, a recipient's address block 404, and a challenge block 506. The sender's address block 502 contains human readable text and includes the name and return address of the sender. Recipient's address block 504 likewise contains human readable text and contains the name and address of the authorized recipient. Challenge block 506 (which is an encrypted authentication message) is an encrypted message which is presented in text which may be read by a human or by an optical character reader or scanner. The text of challenge block 506 may be accompanied by a bar code version, or the like, or the bar code version may be used in place of human readable text. In this method and type of fixed medium for implementing the invention, the authorized recipient decrypts the challenge block and then obtains a content decryption key according to the methods described above. The result of such decoding may be a message such as message 550 as is shown in FIG. 6B, that is, the following message: "Steven Security, 4090 Pleasant Road, Sunnyvale, Mass. 02213; reply: http://www.hp.com; ack: 1231254323." The web address 554 is an address which the sender can use to send an automated, or electronic mail reply containing a valid reply, to the sender. The "Steven Security" 552 in the message is the name of the sender of the encrypted message and the address of the sender follows that name. The number following the "ack" is the decrypted authentication message. This decrypted authentication message can not only serve as verification of successful decryption by the authorized recipient but it may also as a unique identifier or serial number of the encrypted message or it can alone serve as a valid reply message by simply quoting it back to the sender. In this method and type of fixed medium of implementing the invention, the envelope 500 contains a page (not illustrated) which is encrypted text or encrypted bar code readable material.

Figure 7:
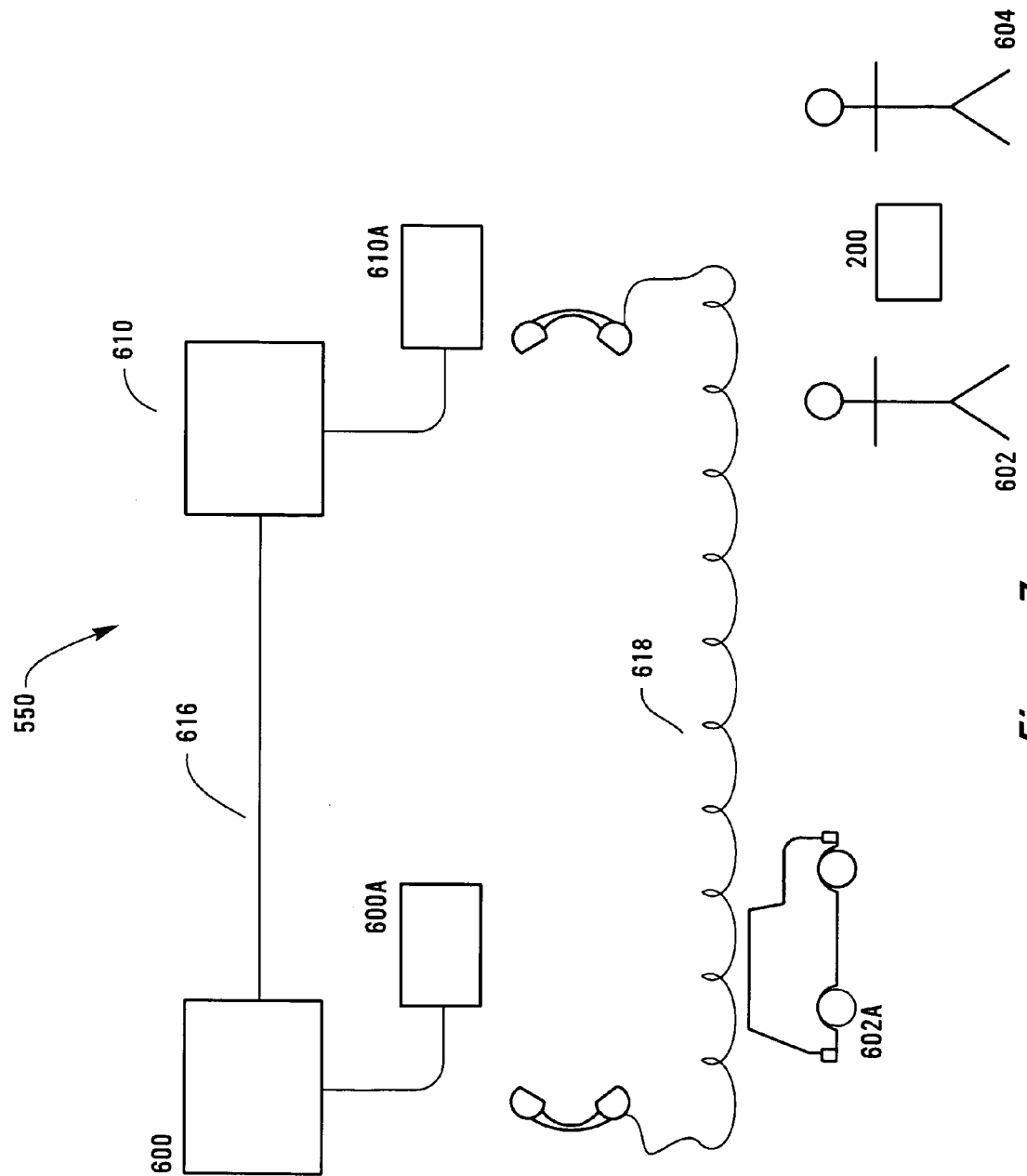
FIG. 7 is a drawing of equipment and other resources that may be used in carrying out the present invention.

FIG. 7 illustrates equipment and other resources that may be used in carrying out the present invention. Sender's computer system 600 is used by sender for performing data processing, i.e., creation of the authentication and content messages and for encrypting those messages. Thus sender's computer system 600 is used for performing steps 20 to 34 as illustrated by FIGS. 1A and 1B. Sender's computer system 600 includes media fixer 600A which is a printer, magnetic recorder, optical recorder, or some such similar device for fixing the encrypted content message 202 and encrypted authentication message 204 onto fixed tangible medium 200 (or 400, 500, etc.).

Sender's messenger 602, perhaps using delivery vehicle 602A, delivers fixed tangible medium 200 to authorized recipient 604 (who may in fact be the authorized recipient who in turn delivers the fixed tangible medium to the authorized recipient 604).

Authorized recipient 604 uses receiver's computer system 610 along with receiver's scanner 610A to scan or read into receiver's computer system 610 the encrypted contents of fixed tangible medium 200. This reading-in consists of reading both the encrypted content message 202 and the encrypted authentication message. The authorized recipient 604 then uses receiver's computer system to carry out the steps 104 to 114 of FIG. 2A, and to carry out steps 116A and 110A to 114A of FIG. 2B. That is, the authorized recipient uses the receiver's computer system 610 along with receiver's scanner 610A to input the encrypted messages, to decrypt the decrypted messages, and to read the encrypted messages. Receiver's computer system 610 and sender's computer system 600 may be connected to a pubic network 616, such as the internet, or to a private data network. In such case, the steps of 42, 44, 110 and 112 may be implemented by computer-to-computer communication over such a network. Alternatively, steps 42, 44, 110, and 112 may be implemented using other means of communication such as a by telephone system 618. Thus, the communication steps of the recipient sending a valid reply to sender 110, the sender receiving a valid reply 42, the sender allowing the recipient to obtain the content decryption key 44, and the recipient receiving the content decryption key 112 may be carried out using the network 616 or the telephone system 618.

Although several embodiments of the present invention have been disclosed and illustrated, the invention is not limited to the specific forms or arrangements of parts so described and illustrated. The invention is only limited by the claims.

What is claimed is:

1. A method for a sender to send an encrypted message to an authorized recipient, the method having steps comprising:

creating an encrypted content message that may be decrypted using a content decryption key that is unknown to the authorized recipient;

creating an encrypted authentication message that may be decrypted using a recipient's key wherein the recipient's key is known to the authorized recipient but unknown to others except perhaps known to the sender;

fixing the encrypted authentication message and the encrypted content message onto a tangible medium and thereafter permitting the authorized recipient to obtain the tangible medium;

if a valid reply has been received, wherein the valid reply is based upon the decrypted authentication message, then allowing the authorized recipient to obtain said content decryption key.

2. The method of claim 1 wherein the recipient's key is a secret key that is shared between the sender and the recipient.

3. The method of claim 1 wherein the recipient's key is a recipient's private key that is associated with a recipient's public key.

4. The method of claim 1 wherein said step of creating an encrypted authentication message further comprises a step of sender authentication encryption such that the authorized recipient may use a sender's key for decryption of the authentication message thereby authenticating that the sender was the source of the encrypted authentication message, such that the sender's key is known to the authorized recipient, and such that the encrypted authentication message may be decrypted with a decryption step employing said recipient's key and with another decryption step employing said sender's key.

5. The method of claim 4 wherein the sender's key is a secret key that is shared between the sender and the authorized recipient but unknown to others.

6. The method of claim 4 wherein the sender's key is a public key that is associated with a sender's private key.

7. The method of claim 4 wherein the sender's key is a public key that is associated with a sender's private key.

8. The method of claim 1 wherein said step of creating an encrypted content message further comprises a step of sender authentication encryption such that the authorized recipient may use a sender's key for decryption of the encrypted content message thereby authenticating that the sender was the source of the encrypted content message, such that the sender's key is known by the authorized recipient, and such that the encrypted content message may be decrypted by a decryption method with a step employing the recipient's key and with another step employing the sender's key.

9. The method of claim 8 wherein the sender's key is a secret key that is shared between the sender and the authorized recipient but unknown to others.

10. The method of claim 1 further comprising receiving the valid reply using the sender after permitting the authorized recipient to obtain the tangible medium, and wherein the allowing is responsive to the receiving.

11. The method of claim 10 wherein the valid reply is generated by the recipient after the recipient obtains the tangible medium.

12. The method of claim 1 wherein the creatings, the fixing and the allowing comprise creatings, fixing and allowing using the sender.

13. The method of claim 1 wherein the fixing comprises permanently fixing the encrypted authentication message and the encrypted content message onto said tangible medium.

14. The method of claim 1 wherein the fixing comprises fixing both the encrypted authentication message and the encrypted content message onto the tangible medium comprising the same medium.

15. The method of claim 14 wherein the same medium comprises a single fixed tangible medium.

16. The method of claim 15 wherein the single fixed tangible medium comprises a compact disc.

17. An article of manufacture for sending an encrypted message from a sender who possesses a content decryption key to a recipient who possesses a recipient's key, the article, comprising:
   a tangible medium;
   an encrypted content message fixed on said tangible medium, wherein said encrypted content message may be decrypted using the content decryption key;
   an encrypted authentication message fixed on said tangible medium, wherein said encrypted authentication message may be decrypted using the recipient's key;
   whereby after the article is delivered to the recipient the recipient may use the recipient's key to decrypt said encrypted authentication message into a decrypted authentication message, the recipient may use the decrypted authentication message to send a valid reply to the sender confirming that the recipient received said article and the sender may then allow the recipient to obtain the content decryption key.

18. The article of claim 17 wherein the recipient's key is a secret key that is shared between the sender and the recipient.

19. The article of claim 17 wherein the recipient's key is a recipient's private key that is associated with a recipient's public key.

20. The article of claim 17 wherein said encrypted authentication message is sender authentication encrypted such that said encrypted authentication message may be decrypted by a decryption method having a step employing the recipient's key and having another step employing a sender's key such that the recipient may use the sender's key to authenticate that the sender was the source of said tangible medium.

21. The article of claim 20 wherein the sender's key is a secret key that is shared between the sender and the authorized recipient but unknown to others.

22. The article of claim 20 wherein the sender's key is a public key that is associated with a sender's private key.

23. The article of claim 17 wherein said encrypted content message is sender authentication encrypted such that said encrypted content message may be decrypted by a decryption method having a step employing the recipient's key and having another step employing a sender's key such that the recipient may use the sender's key to authenticate that the sender was the source of said tangible medium.

24. The article of claim 23 wherein the sender's key is a secret key that is shared between the sender and the authorized recipient but unknown to others.

25. The article of claim 23 wherein the sender's key is a public key that is associated with a sender's private key.

26. The article of claim 17 wherein the encrypted content message and the encrypted authentication message are permanently fixed onto said tangible medium.

27. A method for an authorized recipient to receive an encrypted message from a sender, the method having steps comprising:
   receiving a tangible medium from the sender wherein the tangible medium has fixed upon it an encrypted authentication message and an encrypted content message;
   using a recipient's key to decrypt the encrypted authentication message into a decrypted authentication message, wherein the recipient's key is known to the authorized recipient but unknown to others except perhaps known to the sender;
   creating a valid reply using the decrypted authentication message;
   sending the valid reply to the sender;
   if the recipient has received a content decryption key from the sender, then using the content decryption key to decrypt the encrypted content message.

28. The method of claim 27 wherein the creating and the sending the valid reply comprise creating and sending using the authorized recipient.

29. The method of claim 27 wherein the receiving, the usings, the creating, and the sending comprise receiving, usings, creating and sending using the authorized recipient.

30. The method of claim 27 wherein the using the recipient's key comprises using the recipient's key by the authorized recipient.

31. The method of claim 27 wherein the creating the valid reply comprises creating using the authorized recipient.

* * * * *